(12) United States Patent
Curtis et al.

(10) Patent No.: US 8,526,405 B2
(45) Date of Patent: Sep. 3, 2013

(54) ROUTING NETWORK REQUESTS BASED ON REQUESTING DEVICE CHARACTERISTICS

(75) Inventors: Richard R. Curtis, Lynn, MA (US); John L. Jorgensen, Haverhill, MA (US); Eswar Priyadarshan, West Roxbury, MA (US); Jayasurya Vadrevu, Lexington, MA (US)

(73) Assignee: Apple Inc., Cupertino, CA (US)

( * ) Notice: Subject to any disclaimer, the term of this patent is extended or adjusted under 35 U.S.C. 154(b) by 1016 days.

(21) Appl. No.: 12/138,754

(22) Filed: Jun. 13, 2008

(65) Prior Publication Data

US 2009/0067395 A1 Mar. 12, 2009

Related U.S. Application Data

(60) Provisional application No. 60/943,709, filed on Jun. 13, 2007.

(51) Int. Cl.
*H04W 84/18* (2009.01)
(52) U.S. Cl.
USPC ........... 370/338; 370/337; 370/339; 370/328; 370/329; 370/330; 455/517; 455/219; 455/225; 455/551; 455/560

(58) Field of Classification Search
USPC ................ 370/338, 341, 337, 339, 328, 329, 370/330; 455/517, 560, 219, 225, 551
See application file for complete search history.

(56) References Cited

U.S. PATENT DOCUMENTS

| | | | |
|---|---|---|---|
| 2002/0103931 A1* | 8/2002 | Mott | 709/245 |
| 2006/0039352 A1* | 2/2006 | Karstens | 370/352 |
| 2007/0058596 A1* | 3/2007 | Frid-Nielsen et al. | 370/338 |
| 2007/0165542 A1* | 7/2007 | Shin et al. | 370/254 |
| 2007/0201483 A1* | 8/2007 | Gerasimov et al. | 370/395.5 |
| 2007/0211714 A1* | 9/2007 | Metke et al. | 370/389 |
| 2007/0286159 A1* | 12/2007 | Preiss et al. | 370/352 |

\* cited by examiner

*Primary Examiner* — Brandon Renner
*Assistant Examiner* — Abdelnabi Musa
(74) *Attorney, Agent, or Firm* — Womble Carlyle Sandridge & Rice LLP

(57) ABSTRACT

Disclosed are systems and methods for responding to a web page request from a mobile device by providing the network address of a server hosting content formatted for the mobile device. The systems and methods include means and ways for redirecting a request for URL resolution from a DNS server to an enhanced DNS server with facilities to determine the kind of the requesting device, e.g., whether the requesting device is fixed or mobile.

25 Claims, 4 Drawing Sheets

ROUTING NETWORK REQUESTS BASED ON REQUESTING DEVICE CHARACTERISTICS

CROSS-REFERENCE TO RELATED APPLICATIONS

This application claims priority to and the benefits of U.S. Provisional Application Ser. No. 60/943,709, filed on Jun. 13, 2007, the entire content of which is hereby incorporated by reference.

FIELD OF THE INVENTION

The present invention relates generally to Internet routing, and more specifically to the routing of network requests from mobile devices.

BACKGROUND

The use of mobile phones in the United States and around the world has increased dramatically. It is projected that soon the number of mobile phone users will exceed the number of fixed telephone subscribers. The proliferation of mobile phone usage has engendered corresponding advances in mobile phone technology. Mobile phones can now handle many types of multimedia content. Consumers can navigate the World Wide Web (the "Web") from their mobile phones to much the same degree as from their home computers. The proliferation of these new multimedia mobile phone devices has accordingly created a ripe market for advertising, which both third-party advertisers and wireless carrier companies have become increasingly interested in.

Technology presently in place for browsing the Web on a mobile phone involves knowledge of the phone's characteristics. For instance, a web server receiving a request from a known mobile phone can deliver content suitable for that particular device, e.g., content adjusted to the screen size and resolution of the device or to the bandwidth of the employed communication network. Not only does this approach require more server-side knowledge than may be easily acquired, but it also precludes the wireless carrier from interjecting ads or content. Moreover, in most implementations, the page-serve transaction does not even identify the carrier, essentially eliminating potential revenue sources for carriers and third-party advertisers who wish to target advertising to their customer bases. This approach also limits a carrier's ability to collaborate with third-party advertisers to provide integrated media and advertising content while a subscriber is surfing the web.

SUMMARY OF THE INVENTION

The present invention provides systems and methods for resolving incoming web page requests from subscribers of communication services. Embodiments of the invention determine, initially, whether a request originates from a mobile device (e.g., a cellular phone, PDA, etc.) or from a fixed device such as a conventional personal computer. If the request originates from a mobile device, the mobile network involved is identified. This enables mobile device carriers to provide targeted content to their subscribers, including carrier-specific advertisements informing subscribers of new products or features related to their mobile devices. It also enables wireless carriers to collaborate with third-party advertisers to better target a specific market of mobile device users.

In a first aspect, the invention involves a method of providing mobile content over a network by determining, upon receipt of a request for content, whether the request originates from a mobile or a fixed device, and, if the device is mobile, returning the network address of a server hosting content formatted for mobile devices. This causes a mobile device to be provided with content configured for display on the device. The request for content may take the form of a uniform resource locator (URL), and in this case, the server whose network address is provided is associated with that URL. The method may include the identification of the network on which the request was conveyed, and, in some embodiments, also the type of mobile device, and the provision of accordingly configured content. Further, it may involve storing network-specific or device-specific content responsive to the request on one or more servers, directing the request to the applicable server, and causing content transmission to the device. The content-hosting server(s) may, but do not have to, belong to the proprietor of the mobile network. If the server(s) belong to the proprietor of the mobile network, the network carrier may contribute to content provided to the mobile device.

In a second aspect, the invention concerns a method of providing mobile content over a network to a device that has already been identified as mobile. The method involves receiving a request from a mobile device, identifying the employed mobile network and, optionally, the type of mobile device, and providing, based on the identification, a network address of a server hosting content formatted for display on the mobile device.

In a third aspect, the invention provides a system for handling requests for content over a network. The system includes a first facility which determines whether a request originates from a mobile device or a fixed device, and a second facility responsive to the first. When the system receives a request from a mobile device, the second facility determines the network address of a server hosting content formatted for the mobile device. The system may further include a third facility for determining the mobile network and, optionally, the type of the mobile device. This third facility may be integrated with the first or the second facility. The system may also contain a host server storing content specific to mobile devices and/or networks, including the requesting device and/or associated network.

In a fourth aspect, the invention provides a modified system that handles requests for content over a network which are known to originate from mobile devices. The system includes a first facility that identifies the mobile network and, in some embodiments, the type of the mobile device, and a second facility that provides a network address of a server hosting suitably formatted content. Again, the host server storing network-specific or device specific content may be part of the system.

In a fifth aspect, the invention provides an article of manufacture with computer-readable program portions. These computer-readable portions include instructions for determining whether a request for content over a network originates from a mobile or a fixed device, and for providing, in response to a request from a mobile device, the network address of a server hosting content formatted for said device. They may also include instructions for determining the specific mobile network and device.

BRIEF DESCRIPTION OF THE DRAWINGS

The foregoing discussion will be understood more readily from the following detailed description of the invention when taken in conjunction with the accompanying drawings.

DETAILED DESCRIPTION OF THE INVENTION

Figure 1:
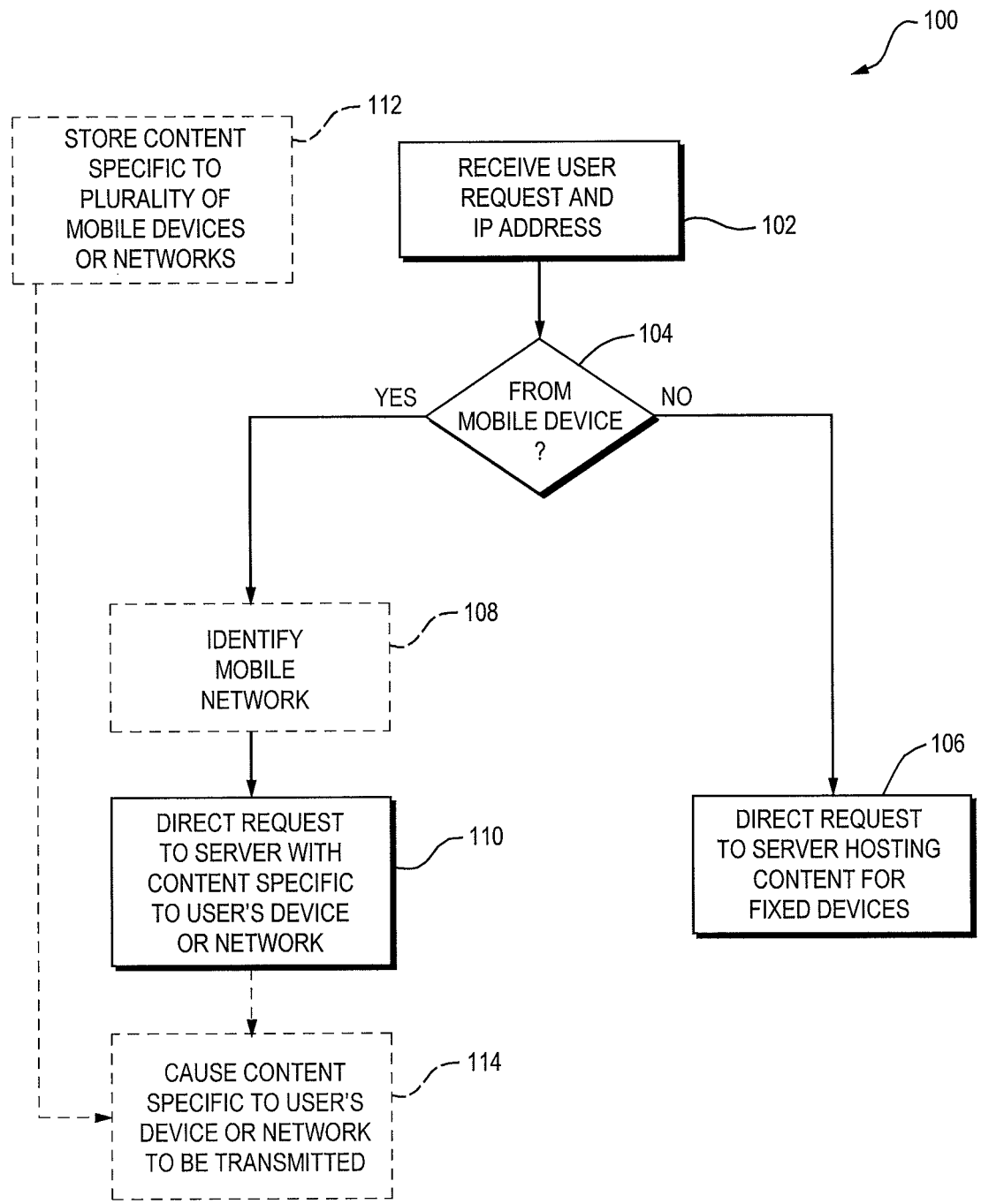
FIG. 1 is a flow chart illustrating a method for providing content specific to communication devices according to one embodiment of the invention.

A user operating an Internet browsing application (browser) typically submits a web page request in the form of a uniform resource locator (URL), either by directly entering the URL or by executing (e.g., clicking on or somehow electing) a link containing the URL. The web page request is handled in two steps: First, the browser sends the URL to a series of domain name system (DNS) servers, which resolve the URL, in a manner well known in the art, piecewise and from the top-level down into the network address (such as an IP address) of the web server hosting the requested content. Second, the browser requests the web page from the server at the identified network address.

In embodiments of the present invention, a low-level DNS server redirects the request to an enhanced DNS server, i.e., it returns the network address of the enhanced DNS server instead of the network location of the content. The enhanced DNS server determines the network over which the request was sent, and provides the network address of a server hosting a version of the requested content specific to the user's network or device. Typically, although not necessarily, the URL initially entered by the user corresponds to web content created for fixed devices, such as desktop computers, and the enhanced DNS server redirects requests coming from mobile devices to web content modified for the particular device, but essentially complying with the user's request. For example, elements of the original content for fixed devices can be visually rearranged or resized or in some instances deleted or substituted to allow for a more suitable presentation on the smaller display of the mobile device. The enhanced DNS server may be managed by the content providers, or, in some cases, be operated by a service provider on its behalf.

As used herein, mobile devices include, but are not necessarily limited to, electronic communication devices with Internet access capability having a smaller display than standard stationary communication devices such as computers. In particular, mobile devices include mobile phones and other wireless handheld devices, e.g. SmartPhones, iPhones, or BlackBerrys, or any other type of portable electronic communication device with Internet access. However, portability, while giving reason to the term "mobile", is not an essential feature of mobile devices according to the invention. Instead, the distinguishing feature of mobile devices as the term is used herein is a display or screen of a size or resolution that renders the visual adjustment of web content to the device necessary or desirable. In addition, mobile devices may have different or diminished user input facilities as compared to other communication devices; and consequently, adjusted navigational tools and input fields may also be desirable. Furthermore, mobile networks may provide limited bandwidth, placing constraints on the media types and amount of content suitable for delivery to mobile devices.

The term "mobile carriers" (also "wireless carriers", or simply "carriers") typically refers to companies operating mobile networks and providing services to mobile phone subscribers, such as Verizon, AT&T, and T-Mobile.

The term "fixed devices" as used herein refers to electronic communication and/or data processing devices with Internet access capability and with a screen or display of standard size and resolution, wherein the term "standard" signifies that little or no visual adjustment of web content is needed for rendering or display. Fixed devices include, in particular, desktop computers. However, laptop computers, although portable, are also considered "fixed" herein if their screen size and resolution suffice to support the display of web content without adjustment.

Servers include computers providing services to other computing devices upon request over a network, such as http servers using TCP/IP. The term "server" is meant to apply to both individual computers and to systems containing more than one computer.

FIG. 1 illustrates the steps of a method 100 for providing, in response to a user's request, content specifically designed and/or modified for delivery to and rendering on the user's communication device. In a first step 102, the user request and the network address of the device sending the request are received at a server. The network address is used in step 104 to determine whether the request originates from a fixed or a mobile device. If the device is fixed, the request is redirected to a server hosting content for fixed devices in step 106. In some cases, the server receiving the request and the server providing the content are one and the same. If the device is mobile, the mobile network may be determined, again based on the network address of the device, in step 108. This determination step 108 may utilize a database of fixed and mobile communication networks containing the network address ranges of the devices serviced by these networks. Such a database may also contain information about the particular type of device associated with a certain IP address. The request is then redirected to a server hosting mobile content specific to the user's device and/or network in step 110. This mobile content can be a version of the requested content adapted for display on the mobile device, or it can be enhanced by additional content specific to the user's mobile network or device, e.g., by one or more advertisements. The method can further include storing content specific to, typically, a plurality of mobile devices or networks, but at least the user's device (step 112), and causing content specific to the user's device or mobile network to be transmitted to the user (step 114).

Figure 2A:
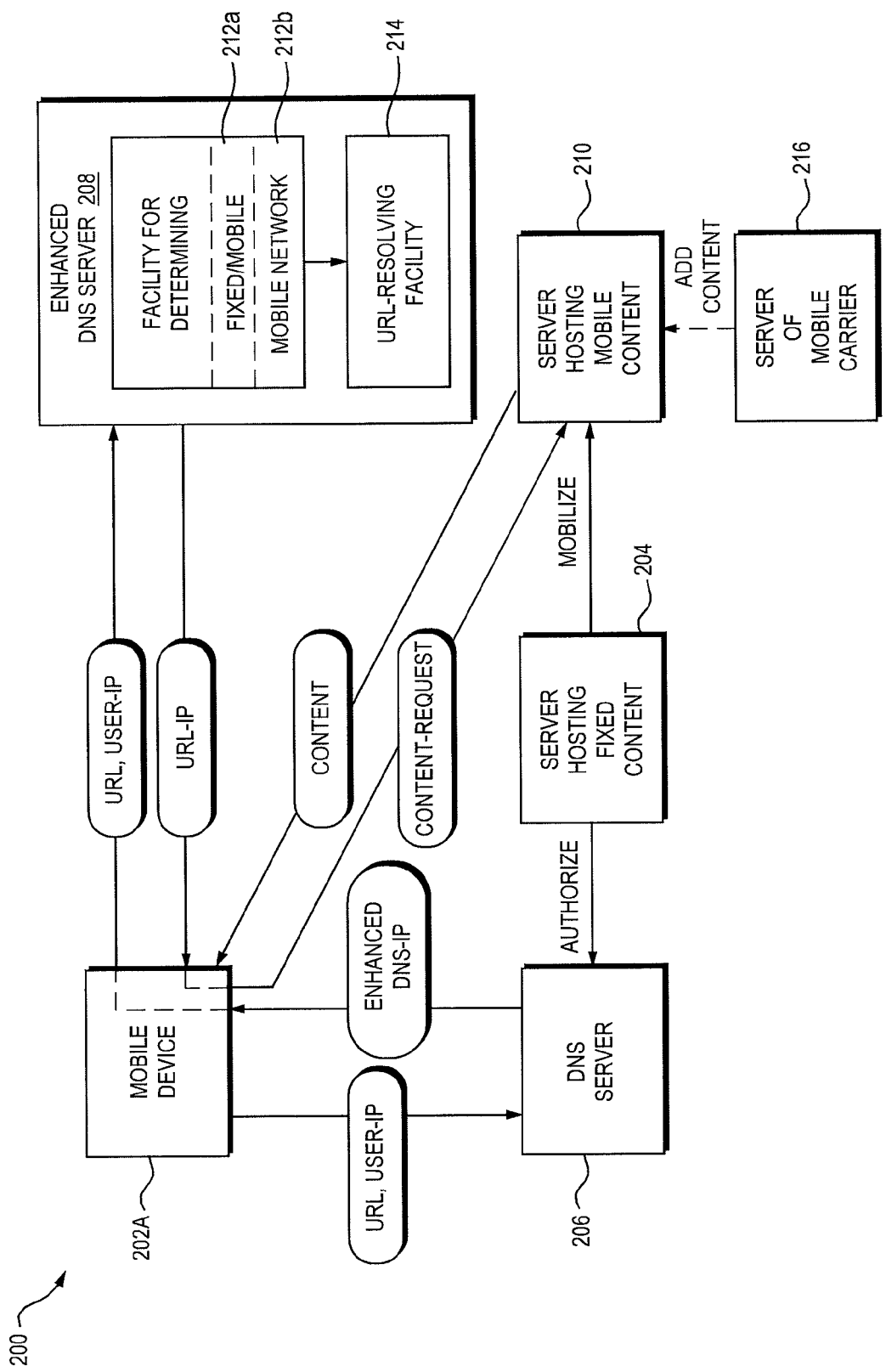
FIGS. 2A and 2B are schematic diagrams depicting a system for providing content specific to mobile and fixed communication devices, respectively, according to various embodiments of the invention.
Figure 2B:
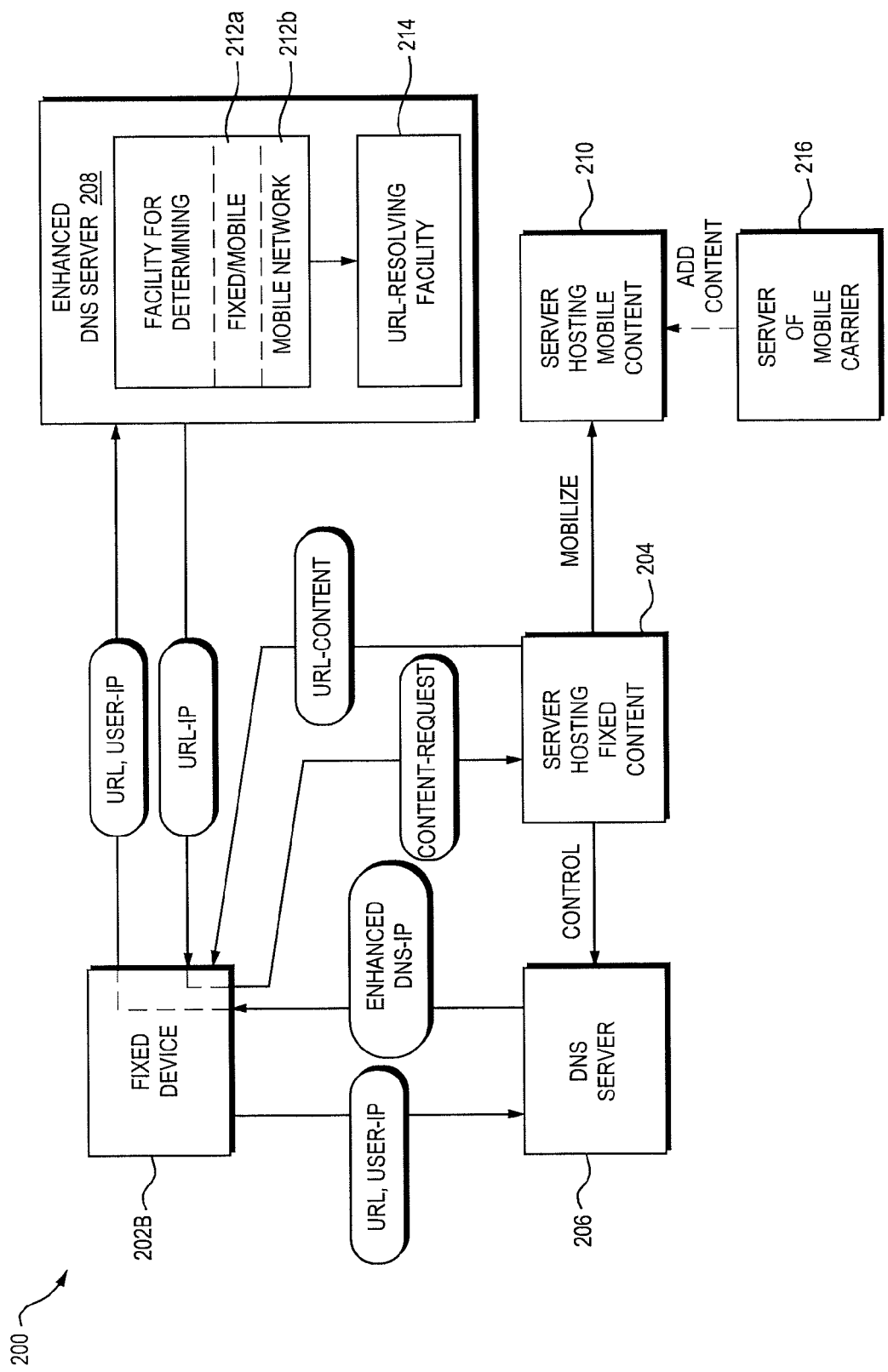

FIGS. 2A and 2B depict a system 200 in which method 100 can be implemented. FIG. 2A illustrates the operation of the system with a mobile device 202A, and FIG. 2B illustrates the operation of the system with a fixed device 202B. The system includes a server 204 hosting web content, and a DNS server 206 containing URLs of (at least some of) the web content hosted on server 204, along with the network address (e.g., IP address) of server 204, in its DNS look-up table. Further, the system includes an enhanced DNS server system 208 (containing one or more servers) with mobile discovery enhancement, and a sever 210 hosting "mobilized" versions of the content on server 204, i.e., versions adapted for display on various mobile devices.

When the DNS server 206 receives a request for content stored on server 204 from a communication device 202 (whether the devices is fixed or mobile), it directs the device 202 to resend the request to the enhanced DNS server 208 by providing the corresponding network address. DNS server 206 is, directly or indirectly, authorized to do so by the content provider of the web content stored on server 204. For instance, the DNS server 206 may be operated by the content provider of a specific domain or domain family having content stored on server 204, and resolve URLs pertaining to this domain. Alternatively, the DNS server 206 may be operated by a hosting service which stores content of domains belonging to various content providers, including the content stored on server 204.

The device 202 sends its redirected request for URL resolution to the enhanced DNS server system 208, which contains a facility 212 for identifying the communication device from which the request originated. This facility includes a module 212a which determines, based on the network address of the requesting device, whether the device is fixed or mobile. It may further include a module 212b which, if applicable, identifies the particular mobile network and (optionally) the type of mobile device. In order to determine this information from the network address, the facility 212 can, for example, utilize a database of fixed and mobile communication networks containing the network address ranges of the devices serviced by these networks.

The enhanced DNS server 208 also contains a facility 214 for resolving a ULR corresponding to content stored on server 204 into the network address of the server (e.g., server 204 or 210) hosting the applicable device-specific content associated with said URL, based on the network and device identified in module 212. As shown in FIG. 2A, the enhanced DNS server 208 responds to the request from a mobile device 202A with the network address of a server 210 hosting a mobile version of the desired content, i.e., a version adjusted to or adapted for the particular mobile device.

In response to receiving a request for content from the mobile device 202A, the server 210 sends the content to the device 208. In some embodiments, the mobile content is supplemented with additional media content specific to the user's mobile network, the device, or both. This additional content may be provided to server 210 by a server 216 associated with the mobile carrier, and may, for example, take the form of targeted advertisements, either sponsored by the user's mobile carrier or by a third party in collaboration with the mobile carrier. FIG. 2B illustrates the above-described process when the requesting device is a the fixed device 202B. In such cases, the fixed device 202B receives the network address of the server 204 from the enhanced DNS server 208, and subsequently receives the desired fixed content from the server 204.

To determine which server can provide content suitable for the user's device, the enhanced DNS server 208 may include a database housing data supplied by the user, including, for example, the mapping of domain names to IP addresses for websites the user often visits on his or her desktop computer. The database may further house data supplied by the manager of the enhanced DNS server, for example, mappings of the mobile versions of web pages likely to be requested by users to network addresses. In some embodiments, the mappings are grouped by mobile carrier. The enhanced DNS server 208 may also contain an updater facility which periodically updates the information stored in the enhanced DNS server 208.

Figure 3:
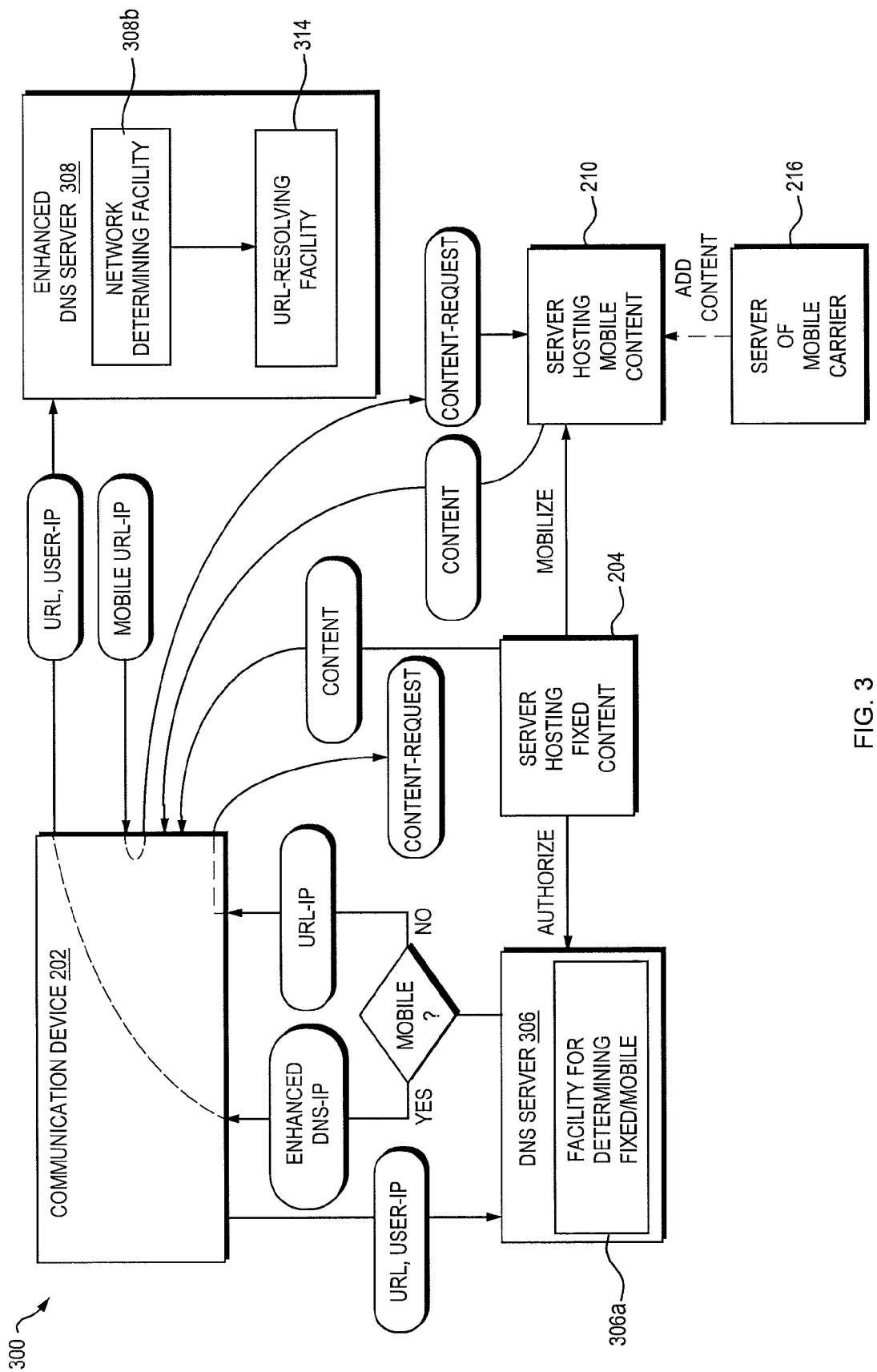
FIG. 3 is a schematic diagram depicting a system for providing content specific to communication devices according to certain embodiments of the invention.

The determination whether the communication device is fixed or mobile and the identification of the specific mobile network do not necessarily have to take place on the same DNS server. Instead, as illustrated in FIG. 3, a first DNS server 306 can include a module 306a for determining whether the communication device 202 is fixed or mobile. If the device is fixed, the DNS server 306 returns the network address of server 204, which hosts the requested content. If the device is mobile, however, server 306 provides the network location of a second server 308 enhanced by a facility 308b that determines the user's mobile network, and a facility 314 for resolving the URL into the network address of a server 210 hosting a version of the requested content adjusted to the device 202. Upon request by the device 202, the server 210 provides mobile content, optionally supplemented by content from a server 216 operated by or otherwise under control of the mobile carrier.

Device-specific content can be grouped and hosted in various ways. In some embodiments, the server 210 hosting content for mobile devices is part of the enhanced DNS server 208, or is a related server operated by the same manager. In this case, the server 210 typically (but not necessarily) hosts several mobilized versions for multiple content providers, i.e., mobile content derived from the content stored on multiple servers 204 and adjusted to several mobile networks. The server 210 can be partitioned according to the different content providers and/or mobile networks. In alternative embodiments, a wireless carrier manages the mobilized versions of content otherwise stored on multiple servers 204. In this scenario, the versions adjusted to different mobile networks but pertaining to the same original content 204 are typically located on different servers 210 operated by the corresponding carriers. In yet another class of embodiments, the provider or host of content stored on server 204 may also host the mobilized versions on server 210. The three described distributions of fixed and mobile content are exemplary only. Combinations of all three embodiments as well as additional embodiments are possible and within the scope of the invention.

In another aspect, the invention provides an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Although the present invention has been described with reference to specific details, it is not intended that such details should be regarded as limitations upon the scope of the invention, except as and to the extent that they are included in the accompanying claims.

What is claimed is:

1. A method of providing mobile content over a network, the method comprising the steps of:

receiving a request for content at a first domain name system (DNS) server;

determining whether a device type of a device, from which the request originates, is a mobile device type or a fixed device type; and, when the device, from which the request originates, is a mobile device;

providing a network address of a server hosting content formatted for the mobile device type, thereby causing provision to the mobile device of content configured for display on the mobile device, wherein subsequent to the receiving of the request for content at the first DNS server, the method further comprises instructing the device, from which the request originates, to redirect the request to a second DNS server in the network to perform the providing of the network address of the server hosting content formatted for the mobile device type, the instructing performed by the first DNS server after processing of the request on the first DNS server is completed, and wherein subsequent to the receiving of the request for content at the first DNS server, the method further comprises processing the request using the first DNS server to obtain a network address of a server hosting content formatted for the fixed device type to cause provisioning to the device of content not configured for display on the mobile device, when the first DNS server is not authorized to redirect requests for content to the second DNS server.

2. The method of claim 1 wherein the request for content is identified by a uniform resource locator and the server hosting content formatted for the mobile device type is associated with said uniform resource locator.

3. The method of claim 1 wherein the providing of the network address of the server hosting content formatted for the mobile device type comprises identifying a mobile network on which the request was conveyed, and, based at least in part on the identified mobile network, causing provision to the mobile device of content configured for display on the mobile device.

4. The method of claim 3 wherein causing provision of the content comprises:
storing, on at least one server, network-specific content responsive to the request;
directing the request to a server on which content specific to the mobile network is stored; and
causing the network-specific content to be transmitted to the mobile device.

5. The method of claim 4 wherein the server, on which the content specific to the mobile network is stored, belongs to a proprietor of the mobile network.

6. The method of claim 5 wherein the proprietor of the mobile network contributes to the content specific to the mobile network.

7. The method of claim 4 wherein the server, on which the content specific to the mobile network is stored, does not belong to a proprietor of the mobile network.

8. The method of claim 3 wherein the providing of the network address of the server hosting content formatted for the mobile device type further comprises:
identifying a type of the mobile device, and
based at least in part on the identified type, causing provision to the mobile device of content configured for display on the mobile device.

9. The method of claim 8 wherein causing provision of the content comprises:
storing, on at least one server, device-specific content responsive to the request;
directing the request to a server on which content specific to the mobile device resides; and
causing the device-specific content to be transmitted to the mobile device.

10. A method of providing mobile content over a network, the method comprising the steps of:
receiving a request for content from a mobile device;
identifying the network on which the request was conveyed;
based on the identification, providing a network address of a server hosting content formatted for the mobile device, thereby causing provision to the mobile device of content configured for display on the mobile device; and
when a first DNS server is authorized to redirect requests for the content to a second DNS server:
subsequent to the receiving of the request, instructing the mobile device to redirect the request to the second DNS server in the network, where the second DNS server provides a network address of a server hosting content formatted for the mobile device, the instructing performed after processing the request is completed; and
when the first DNS server is not authorized to redirect requests for the content to the second DNS server:
subsequent to the receiving of the request, processing the request to obtain a network address of a server hosting content formatted for a fixed device type to cause provisioning to the mobile device of content not configured for display on the mobile device.

11. The method of claim 10 wherein identifying the network on which the request was conveyed further comprises identifying a type of the mobile device.

12. A system for handling requests for content over a network, the system comprising:
a first domain name system (DNS) server configured for receiving a request originating from a mobile device;
a first facility configured to identify, in response to the request originating from the mobile device, a mobile network on which the request was conveyed; and
a second DNS server having a second facility located in the second DNS server and configured to provide a network address of a server hosting content formatted for mobile devices, thereby causing provision to the mobile device of content configured for display on the mobile device,
wherein the first facility is located in one of the first DNS server and the second DNS server, and wherein the first DNS server is configured to instruct the mobile device to redirect the request to the second DNS server to receive supplemental content formatted for the mobile device provided by a content provider after processing of the request on the first DNS server is completed, and
wherein subsequent to receiving the request, the first DNS server redirects the request based on authorization by the content provider.

13. The system of claim 12 further comprising a host server configured to store content specific to at least one mobile network including the mobile network associated with the requesting mobile device.

14. The system of claim 12 wherein the first facility is further configured to identify a type of the mobile device.

15. The system of claim 14 further comprising a host server configured to store content specific to at least one type of mobile device including the type of the requesting mobile device.

16. A domain name system (DNS) server comprising:
a processor;
a non-transitory computer-readable medium comprising instructions which are configured to, when executed by the processor, cause the DNS server to:
receive a request from a device;
identify whether a type of the device comprises a mobile device type or a fixed device type;
determine whether a content provider has authorized the DNS server to redirect the request; and
when the type of the device comprises the mobile device type, and the content provider has authorized the DNS server to redirect the request, process the request; and after the request has been processed by the DNS server, redirect the request to an enhanced DNS server; and when the type of the device comprises the mobile device type, and the content provider has not authorized the DNS server to redirect the request, obtain a network address of a server hosting content formatted for a fixed device type to provision content not configured for display on the device.

17. The DNS server of claim 16, where the request comprises a request for a uniform resource locator (URL).

18. The DNS server of claim 16, further comprising logic configured to provide at least a portion of standard content associated with the request.

19. The DNS server of claim 18, where the enhanced DNS server is configured to provide at least a portion of supplemental content associated with the request.

20. The DNS server of claim 18, where the enhanced DNS service is configured to provide one or more advertisements.

21. A method for providing supplemental content to a mobile device, the method comprising:

receiving one or more requests from a plurality of devices;

for each one of the received one or more requests, identifying whether the request is associated with a mobile device type; and for each request associated with the mobile device type and a content provider has authorized redirection:

providing a standard content based on the request, and redirecting the request to an enhanced DNS server; and for each request associated with the mobile device type and a content provider has not authorized redirection;

obtaining a network address of a server hosting content formatted for a fixed device type to provision content not configured for display on a mobile device.

22. The method of claim 21, where the plurality of devices comprise a population of the mobile device type and a fixed device type.

23. The method of claim 22, where the standard content is also provided to requests associated with the fixed device type.

24. The method of claim 23, where the enhanced DNS server is configured to provide at least a portion of supplemental content associated with the request.

25. The method of claim 24, where the supplemental content comprises one or more content which has been adjusted for the mobile device type.

\* \* \* \* \*